United States Patent
Hecker et al.

(10) Patent No.: US 8,412,447 B2
(45) Date of Patent: Apr. 2, 2013

(54) METHOD AND DEVICE FOR EFFECTING A COMPUTER-AIDED ESTIMATION OF THE MASS OF A VEHICLE, PARTICULARLY OF A COMMERCIAL VEHICLE

(75) Inventors: Falk Hecker, Markgroeningen (DE); Matthias Horn, Stuttgart (DE); Ulrich Guecker, Schwieberdingen (DE); Stefan Hummel, Stuttgart (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 2103 days.

(21) Appl. No.: 10/546,625

(22) PCT Filed: Feb. 20, 2004

(86) PCT No.: PCT/EP2004/001666
§ 371 (c)(1),
(2), (4) Date: Feb. 27, 2006

(87) PCT Pub. No.: WO2004/074057
PCT Pub. Date: Sep. 2, 2004

(65) Prior Publication Data
US 2006/0149424 A1     Jul. 6, 2006

(30) Foreign Application Priority Data
Feb. 21, 2003 (DE) .................................. 103 07 511

(51) Int. Cl.
*G01G 19/03* (2006.01)
(52) U.S. Cl. ......... 701/124; 702/173; 702/174; 702/175
(58) Field of Classification Search .................. 702/127, 702/141, 142, 146, 173, 174, 175; 73/488, 73/503, 510, 514.2; 701/1, 45, 124; 303/121, 303/132
See application file for complete search history.

(56) References Cited

U.S. PATENT DOCUMENTS

| | | | | |
|---|---|---|---|---|
| 4,773,013 A | * | 9/1988 | Crapanzano et al. | 701/79 |
| 6,167,357 A | * | 12/2000 | Zhu et al. | 702/175 |
| 6,314,383 B1 | | 11/2001 | Leimbach et al. | |
| 6,339,749 B1 | | 1/2002 | Rieker et al. | |
| 6,347,269 B1 | * | 2/2002 | Hayakawa et al. | 701/51 |
| 6,567,734 B2 | * | 5/2003 | Bellinger et al. | 701/51 |
| 6,633,066 B1 | | 10/2003 | Bae et al. | |
| 6,745,112 B2 | * | 6/2004 | Mori | 701/1 |

FOREIGN PATENT DOCUMENTS

| | | |
|---|---|---|
| DE | 42 28 413 | 3/1994 |
| DE | 198 02 630 | 9/1999 |
| DE | 198 59 022 | 6/2000 |
| DE | 101 44 699 | 4/2002 |
| JP | 2002-221442 | 8/2002 |
| JP | 2002-333365 | 11/2002 |
| WO | WO 00/11439 | 3/2000 |

OTHER PUBLICATIONS

V. T. Randal, J. L. Schmalzel, and A. P. Shepard, "Floating-Point Computation Using a Microcontroller," Proceedings of the Annual International Conference of the IEEE, 1988, pp. 1243-1244, vol. 3.*
M. Predko, Programming and Customizing the PIC Microcontroller. New York, NY: McGraw-Hill, 1998.*

* cited by examiner

*Primary Examiner* — Thomas Black
*Assistant Examiner* — Peter D Nolan
(74) *Attorney, Agent, or Firm* — Kenyon & Kenyon LLP

(57) ABSTRACT

A method is for effecting a computer-aided estimation of the mass of a vehicle, e.g., of a goods-carrying vehicle, based on the equilibrium ratio between the driving force and the sum of the inertial force and drive resistances, in which the mass and a gradient angle of the roadway are contained as quantities. The method may include: a) computer-aided differentiation of the equilibrium ratio according to the time with the assumption that the gradient angle is constant; and b) calculating the mass of the vehicle and/or the reciprocal value of the mass from the equilibrium ratio differentiated according the time.

35 Claims, No Drawings

METHOD AND DEVICE FOR EFFECTING A COMPUTER-AIDED ESTIMATION OF THE MASS OF A VEHICLE, PARTICULARLY OF A COMMERCIAL VEHICLE

FIELD OF THE INVENTION

The present invention relates to a method and a device for effecting a computer-aided estimation of the mass of a vehicle, e.g., of a commercial or goods-carrying vehicle.

BACKGROUND INFORMATION

In electronic vehicle systems such as electronic stability programs (ESP) for regulating driveability in the extreme range from the standpoint of driving dynamics, or in electronically regulated brake systems (EBS) for commercial vehicles, a value is generally needed for the mass of the vehicle. Since as a rule, no sensors are present for ascertaining the mass, the vehicle mass must be calculated or estimated by suitable algorithms.

German Published Patent Application No. 42 28 413 describes a method for determining the vehicle mass, in which two longitudinal vehicle accelerations at at least two different points of time and the propulsive powers existing at these points of time are measured. The vehicle mass is then determined from the difference between the propulsive powers and the difference between the longitudinal accelerations.

According to German Published Patent Application No. 198 02 630, to determine the vehicle mass, the propulsive power and the corresponding longitudinal vehicle acceleration are measured at points of time continually following each other with constant time intervals.

U.S. Pat. No. 6,347,269 describes ascertaining the vehicle mass on the basis of the propulsive powers, the running resistances and the vehicle acceleration, the influence of the roadway inclination being eliminated by a high-pass filter.

According to PCT International Published Patent Application No. WO 00/11439, to ascertain the vehicle mass, at least two time-staggered measurements are determined, including one tractive-force variable and one movement variable of the vehicle, one of the two measurements being carried out during a phase free of tractive force, and the other during a tractive-force phase.

In German Published Patent Application No. 101 44 699, a method is described which is based on the equilibrium relationship or ratio between the motive or driving force on one hand, and the accelerative force and the climbing resistance. This equilibrium relationship reads:

$$F = m \cdot (a + g \cdot \sin \alpha) \tag{1}$$

where
F=motive force
a=time derivation of the longitudinal vehicle velocity
α=gradient angle of the roadway
g=gravitational acceleration
m=vehicle mass In equation (1), the accelerative force is represented by the product m•a, and the climbing resistance by the product m·g·sin α. To calculate mass m of the vehicle, equation (1) is therefore solved for m, and the instantaneous values for F, a and α are determined from measured quantities. Since gradient angle α of the roadway being traveled at any one time is not known, as a rule it is estimated with the aid of a computer during coupling phases or during phases without or with very low motive force, or is disregarded altogether. When using converter clutches or powershift transmissions, however, such freewheeling phases are no longer available, so that a sufficiently accurate estimation of the vehicle mass may be difficult.

SUMMARY

An example embodiment of the present invention may provide a method for effecting a computer-aided estimation of mass m of a vehicle such that the above-indicated disadvantages may be avoided. An example embodiment of the present invention may provide a device for the application of the method.

DETAILED DESCRIPTION

An example embodiment of the present invention may include evaluating changes in the operating state of the vehicle over time t for estimating the vehicle mass. When a vehicle is traveling along any route, gradient angle α of the roadway is a function of time t. If one differentiates equation (1) with respect to time t, the following equation results:

$$\dot{F} = m \cdot (\dot{a} + g \cdot \dot{\alpha} \cdot \cos \alpha) \tag{2}$$

Assuming the change in gradient angle α(t) is very small in time interval dt considered, the influence of gradient angle α(t) may be minimized or eliminated. Then $\dot{\alpha} = d\alpha/dt \approx 0$ applies, and equation (2) reads as follows:

$$\dot{F} = m \cdot \dot{a} \tag{3}$$

Due to the time derivation of equation (2), it may therefore be possible to eliminate the influence of gradient angle α, assumed to be constant for a time, in equation (3), so that gradient angle α may not have to be estimated, calculated or measured by a cost-creating sensor.

Equation (3) solved for estimated value $\hat{m}$ of the vehicle mass then reads:

$$\hat{m} = \frac{\dot{F}}{\dot{a}} \tag{4}$$

Equation (4) thus forms the estimate equation for mass m of the vehicle. The estimate equation may be calculated continuously, e.g., by recursive methods. The recursive algorithms used may contain so-called forget factors with which the behavior of the algorithm may be adjusted. The forget factors are adjusted in the direction of faster convergence in suitable situations, e.g., during longer stand-still times in which mass m of the vehicle may change.

To estimate m according to equation (4), the variables F and a or $\dot{F} = dF/dt$ and $\dot{a} = da/dt$ may need to be determined.

Motive force F includes, inter alia, the known running resistance and drive resistance developing, for example, due to friction losses in the engine and transmission, etc., and/or sustained braking forces:

$$F = \frac{M \cdot \omega - \Theta \cdot \dot{\omega}}{v} \cdot \eta - 1/2 p \cdot c_w \cdot A \cdot v^2 \tag{5}$$

where
M=Engine torque including friction torque
ω=Engine speed
v=Vehicle velocity
A=Frontal area of the vehicle
η=Drive-train efficiency Θ=Moment of inertia of the engine
ρ=Density of the air
$c_W$=Drag coefficient The quantities in equation (5) therefore include vehicle-specific quantities such as moment of inertia of the engine Θ, drag coefficient $c_w$, frontal area A and drive-train efficiency η of the vehicle. The vehicle-specific quantities may be stored in a memory unit of a control unit of the vehicle. Furthermore, equation (5) includes quantities concerning the instantaneous driving conditions of the vehicle such as engine torque M, engine speed ω, vehicle velocity v and density ρ of the ambient air that are measurable or are constantly able to be fetched in the control unit of the vehicle. From the indicated data or quantities, a calculating unit, e.g., the control unit of the vehicle itself, is able to calculate motive force F and acceleration a.

The term à in the denominator of equation (4) is the derivation of vehicle acceleration a with respect to time t and is referred to as jolt. Therefore, mass m may only be estimated during suitable phases in which da/dt and dF/dt is not equal to 0.

The control unit differentiates quantities F and a using suitable methods such as the two-point differentiation method or a state-variable filter, the derivation, e.g., being carried out over longer time intervals. To improve the accuracy of the estimation, the differentiated quantities may subsequently be filtered. For example, using a least-square algorithm, estimated value $\hat{m}$ for the vehicle mass is calculated as follows:

$$\hat{m} = \frac{\sum_{i=1}^{N} \dot{F}_i \cdot \dot{v}_i}{\sum_{i=1}^{N} \dot{v}_i \cdot \dot{v}_i} \quad (6)$$

with i as subscript for the i-th measured value. The measured quantities such as vehicle velocity v are suitably weighted, for example, the weighting being carried out as a function of the accuracy of the measured quantities. Moreover, the measured quantities concerning the instantaneous driving conditions of the vehicle may be filtered as a function of the signal quality. The quantities concerning the instantaneous driving conditions of the vehicle may furthermore be measured repeatedly; and the measurements weighted differently.

Depending on the quality of the measured quantities for vehicle velocity v and force F, instead of calculating $\hat{m}$, it may be more favorable to calculate the reciprocal value $1/\hat{m}$. Alternatively, both a value for $\hat{m}$ and reciprocal value $1/\hat{m}$ may be calculated, and a weighted average value formed.

In addition to the method, a device may be for effecting a computer-aided estimation of the mass of a vehicle, e.g., of a commercial vehicle. This device includes a calculating unit for calculating the mass of the vehicle and/or the reciprocal value of the mass from the equilibrium relationship between motive force F and the running resistances, into which mass m and gradient angle α of the roadway are entered as calculation quantities, after a computer-aided differentiation of the equilibrium relationship with respect to time, assuming gradient angle α is constant. This calculating unit may be integrated into the control unit of the vehicle.

What is claimed is:

1. A method for effecting a computer-aided estimation of a mass of a vehicle, the method comprising:

differentiating, using a computer, an equilibrium relationship, between a motive force and a sum of an inertial force and drive resistances, in which the mass and a gradient angle of a roadway are included as quantities, with respect to time, assuming a constant gradient angle of the roadway, in the vehicle over a time period of travel on the roadway; and calculating, using a computer, at least one of (a) the mass of the vehicle and (b) a reciprocal value of the mass of the vehicle from the equilibrium relationship differentiated with respect to time in the differentiating operation; and providing the mass to at least one of an electronic stability system and an electronically regulated brake system of the vehicle to be used by the at least one of the electronic stability system and the electronically regulated brake system.

2. The method according to claim 1, wherein the vehicle includes a commercial vehicle.

3. The method according to claim 1, wherein the drive resistances include a sum of one of (a) an accelerative force and (b) a deceleration force as a function of the mass and one of (a) an uphill force and (b) a downhill force as a function of the gradient angle.

4. The method according to claim 3, wherein the mass is calculated from the equation:

$$m = \frac{dF/dt}{da/dt},$$

and
wherein a represents a time derivation of a longitudinal vehicle velocity and F represents the motive force of the vehicle.

5. The method according to claim 4, further comprising:
   determining, from measured quantities, the motive force and the one of (a) the acceleration and (b) the deceleration.

6. The method according to claim 5, wherein the measured quantities are available in a control unit of the vehicle.

7. The method according to claim 6, further comprising:
   filtering the measured quantities as a function of a signal quality.

8. The method according to claim 5, further comprising:
   repeatedly measuring the measured quantities; and
   weighting the measurements differently.

9. The method according to claim 1, wherein the differentiating is performed continuously and recursively.

10. The method according to claim 9, wherein the differentiating is performed one of (a) according to a two-point differentiation and (b) with a state-variable filter.

11. The method according to claim 1, the method further comprising:
    forming a weighted average value, wherein the calculating step includes calculating both the mass and a reciprocal value of the mass.

12. The method according to claim 1, further comprising:
    determining, from measured quantities, the motive force and the one of (a) the acceleration and (b) the deceleration;
    repeatedly measuring the measured quantities, and weighting the measurements differently; and
    filtering the measured quantities as a function of a signal quality;
    wherein the drive resistances include a sum of one of (a) an accelerative force and (b) a deceleration force as a function of the mass and one of (a) an uphill force and (b) a downhill force as a function of the gradient angle, wherein the mass is calculated from the equation of $$m = \frac{dF/dt}{da/dt},$$

and a represents a time derivation of a longitudinal vehicle velocity and F represents the motive force of the vehicle, wherein the measured quantities are available in a control unit of the vehicle.

13. The method according to claim 1, wherein the differentiating is performed continuously and recursively, wherein the differentiating is performed one of (a) according to a two-point differentiation and (b) with a state-variable filter, and wherein the calculating includes calculating the mass and a reciprocal value of the mass.

14. The method according to claim 1, wherein the estimated mass is a mass $\hat{m}$ that is determined based on the following estimate equation:

$$\overline{m} = \frac{\dot{F}}{\dot{a}}.$$

15. The method according to claim 14, wherein the estimate equation is calculated continuously by a recursive process.

16. The method according to claim 15, wherein the recursive process uses forget factors with which a behavior of the process is adjustable.

17. The method according to claim 16, wherein the forget factors are adjusted in a direction of faster convergence in a suitable situation.

18. The method according to claim 17, wherein the suitable situation includes a period during longer stand-still times in which the mass m of the vehicle may change.

19. The method according to claim 14, wherein $\dot{F}$ and $\dot{a}$ are determined according to $\dot{F}=dF/dt$ and $\dot{a}=da/dt$.

20. The method according to claim 19, wherein a motive force F includes a known running resistance and drive resistance due to at least one of friction losses in an engine, friction losses in a transmission, and a sustained braking force.

21. The method according to claim 19, wherein:

$$F = \frac{M \cdot \omega - \Theta \cdot \dot{\omega}}{v} \cdot \eta - 1/2 p \cdot c_w \cdot A \cdot v^2,$$

where M=Engine torque including friction torque, $\omega$=Engine speed, v=Vehicle velocity, A=Frontal area of the vehicle, $\eta$=Drive-train efficiency, $\Theta$=Moment of inertia of the engine, p=Density of the air, and $c_W$=Drag coefficient.

22. The method according to claim 21, wherein vehicle-specific quantities include the moment of inertia of the engine $\Theta$, the drag coefficient $c_W$, the frontal area A and the drive-train efficiency $\eta$ of the vehicle, the vehicle-specific quantities being stored in a memory unit of a control unit of the vehicle.

23. The method according to claim 22, wherein instantaneous driving conditions of the vehicle include the engine torque M, the engine speed $\omega$, the vehicle velocity v and the density p of the ambient air, the instantaneous driving conditions of the vehicle being measurable or fetched in the control unit of the vehicle.

24. The method according to claim 23, wherein the mass m is only estimated during suitable phases in which da/dt and dF/dt is not equal to 0.

25. The method according to claim 24, wherein the control unit differentiates quantities F and a using a two-point differentiation method or a state-variable filter, and wherein the derivation is performed over a longer time interval.

26. The method according to claim 25, wherein to improve an accuracy of the estimation, the differentiated quantities are subsequently filtered.

27. The method according to claim 25, wherein to improve an accuracy of the estimation, the differentiated quantities are subsequently filtered using a least-square algorithm, so that the estimated value $\hat{m}$ for the vehicle mass is calculated as follows:

$$\hat{m} = \frac{\sum_{i=1}^{N} \dot{F}_i \cdot \dot{v}_i}{\sum_{i=1}^{N} \dot{v}_i \cdot \dot{v}_i},$$

with i as subscript for the i-th measured value.

28. The method according to claim 27, wherein the measured quantities, including the vehicle velocity v, are weighted as a function of an accuracy of the measured quantities.

29. The method according to claim 27, wherein a reciprocal value $1/\hat{m}$ is determined.

30. The method according to claim 27, wherein a reciprocal value $1/\hat{m}$ is determined, and wherein both $\hat{m}$ and $1/\hat{m}$ are combined to form a weighted average value.

31. A device for effecting a computer-aided estimation of a mass of a vehicle, comprising:
a computer having program code for effecting a computer-aided estimation of a mass of a vehicle by performing the following:
differentiating an equilibrium relationship, between a motive force and a sum of an inertial force and drive resistances, in which the mass and a gradient angle of a roadway are included as quantities, with respect to time, assuming a constant gradient angle, in the vehicle over a time period;
calculating, using a calculation unit, at least one of (a) the mass of the vehicle and (b) a reciprocal value of the mass of the vehicle from the equilibrium relationship differentiated with respect to time in the differentiating operation; and
providing the mass to at least one of an electronic stability system and an electronically regulated brake system of the vehicle to be used by the at least one of the electronic stability system and the electronically regulated brake system.

32. The device according to claim 31, wherein the vehicle includes a commercial vehicle.

33. The device according to claim 31, wherein the calculation unit is integrated into a control unit of the vehicle.

34. The device according to claim 31, wherein:
from measured quantities, the motive force and the one of (a) the acceleration and (b) the deceleration are determined,
the measured quantities are repeatedly measured, and the measurements are weighted differently,
the measured quantities are filtered as a function of a signal quality, the drive resistances include a sum of one of (a) an accelerative force and (b) a deceleration force as a function of the mass and one of (a) an uphill force and (b) a downhill force as a function of the gradient angle, wherein the mass is calculated from the equation of $$m = \frac{dF/dt}{da/dt},$$

and a represents a time derivation of a longitudinal vehicle velocity and F represents the motive force of the vehicle, and the measured quantities are available in a control unit of the vehicle.

35. The device according to claim 31, wherein the differentiating is performed continuously and recursively, wherein the differentiating is performed one of (a) according to a two-point differentiation and (b) with a state-variable filter, and wherein the calculating includes calculating the mass and a reciprocal value of the mass.

* * * * *

UNITED STATES PATENT AND TRADEMARK OFFICE
CERTIFICATE OF CORRECTION

PATENT NO. : 8,412,447 B2
APPLICATION NO. : 10/546625
DATED : April 2, 2013
INVENTOR(S) : Hecker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2266 days.

Signed and Sealed this
First Day of September, 2015

Michelle K. Lee
*Director of the United States Patent and Trademark Office*